US009294722B2

(12) United States Patent
Pahud et al.

(10) Patent No.: US 9,294,722 B2
(45) Date of Patent: Mar. 22, 2016

(54) OPTIMIZED TELEPRESENCE USING MOBILE DEVICE GESTURES

(75) Inventors: Michel Pahud, Kirkland, WA (US); Ken Hinckley, Redmond, WA (US); William A. S. Buxton, Toronto (CA)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 637 days.

(21) Appl. No.: 12/907,244

(22) Filed: Oct. 19, 2010

(65) Prior Publication Data

US 2012/0092436 A1 Apr. 19, 2012

(51) Int. Cl.
*H04N 7/15* (2006.01)
*G06Q 10/10* (2012.01)
*G06F 3/01* (2006.01)

(52) U.S. Cl.
CPC .................. *H04N 7/15* (2013.01); *G06F 3/013* (2013.01); *G06F 3/017* (2013.01); *G06Q 10/10* (2013.01)

(58) Field of Classification Search
CPC ............................... H04N 7/15; H04N 7/147
USPC .......... 348/14.01, 14.02, 14.04, 14.05, 14.07, 348/14.08, 14.09, 52, E7.087, 14.1
See application file for complete search history.

(56) References Cited

U.S. PATENT DOCUMENTS

| | | | |
|---|---|---|---|
| 5,984,475 A | 11/1999 | Galiana et al. | |
| 6,628,767 B1 | 9/2003 | Wellner et al. | |
| 7,106,358 B2 * | 9/2006 | Valliath et al. | 348/14.08 |
| 7,154,526 B2 | 12/2006 | Foote et al. | |
| 7,593,546 B2 | 9/2009 | Jouppi | |
| 7,643,064 B1 | 1/2010 | Jouppi | |
| 8,088,010 B1 * | 1/2012 | Hill | 463/42 |
| 8,194,117 B2 * | 6/2012 | Hetherington et al. | 348/14.12 |
| 2002/0066109 A1 * | 5/2002 | Tam et al. | 725/106 |
| 2002/0140666 A1 * | 10/2002 | Bradski | 345/156 |
| 2003/0085870 A1 | 5/2003 | Hinckley | |
| 2005/0028221 A1 | 2/2005 | Liu et al. | |

(Continued)

FOREIGN PATENT DOCUMENTS

EP 2194468 A1 6/2010
WO 2009018665 A1 2/2009

OTHER PUBLICATIONS

Yong Rui (Automating lecture capture and broadcast: technology and videography, Digital Object Identifier (DOI) 10.1007/s00530-004-0132-9, Multimedia Systems (2004).*

(Continued)

*Primary Examiner* — Yosef K Laekemariam
(74) *Attorney, Agent, or Firm* — Steve Wight; Sandy Swain; Micky Minhas (57) ABSTRACT

Telepresence of a mobile user (MU) utilizing a mobile device (MD) and remote users who are participating in a telepresence session is optimized. The MD receives video of a first remote user (FRU). Whenever the MU gestures with the MD using a first motion, video of the FRU is displayed. The MD can also receive video and audio of the FRU and a second remote user (SRU), display a workspace, and reproduce the audio of the FRU and SRU in a default manner. Whenever the MU gestures with the MD using the first motion, video of the FRU is displayed and audio of the FRU and SRU is reproduced in a manner that accentuates the FRU. Whenever the MU gestures with the MD using a second motion, video of the SRU is displayed and audio of the FRU and SRU is reproduced in a manner that accentuates the SRU.

20 Claims, 5 Drawing Sheets

(56) References Cited

U.S. PATENT DOCUMENTS

| | | | |
|---|---|---|---|
| 2005/0052835 A1 | 3/2005 | Wu et al. | |
| 2007/0182663 A1 | 8/2007 | Biech | |
| 2007/0273755 A1 | 11/2007 | Yang et al. | |
| 2008/0174550 A1* | 7/2008 | Laurila et al. | 345/158 |
| 2008/0184124 A1 | 7/2008 | Agarwal et al. | |
| 2008/0215974 A1* | 9/2008 | Harrison et al. | 715/706 |
| 2008/0298571 A1* | 12/2008 | Kurtz et al. | 379/156 |
| 2009/0040289 A1 | 2/2009 | Hetherington et al. | |
| 2009/0051648 A1 | 2/2009 | Shamaie et al. | |
| 2009/0079813 A1* | 3/2009 | Hildreth | 348/14.03 |
| 2009/0221368 A1* | 9/2009 | Yen et al. | 463/32 |
| 2009/0293012 A1 | 11/2009 | Alter et al. | |
| 2009/0327418 A1 | 12/2009 | Zhang et al. | |
| 2010/0146461 A1* | 6/2010 | Ryu et al. | 715/863 |
| 2010/0228825 A1 | 9/2010 | Hegde et al. | |
| 2010/0262925 A1 | 10/2010 | Liu et al. | |

OTHER PUBLICATIONS

Steptoe, et al., "Eye-Tracking for Avatar Eye-Gaze and Interactional Analysis in Immersive Collaborative Virtual Environments", Proceedings of the 2008 ACM Conference on Computer Supported Cooperative Work (CSCW), Nov. 8-12, 2008, pp. 197-200, ACM, San Diego, CA, USA.

Wolff, et al., "A Review of Tele-collaboration Technologies with Respect to Closely Coupled Collaboration", International Journal of Computer Applications in Technology (IJCAT), 2007, pp. 11-26, vol. 29, No. 1, Inderscience Publishers, Geneve, Switzerland.

Bergstrom, Anthony David., "Visualization of Audio Augmenting Social Interactions", Thesis Submitted to the Graduate College of the University of Illinois at Urbana-Champaign, 2006, pp. 1-77, University of Illinois at Urbana-Champaign, Urbana, IL, USA.

Jouppi, Norman P., "First Steps Towards Mutually-Immersive Mobile Telepresence", Proceedings of the 2002 ACM conference on Computer Supported Cooperative Work (CSCW), Nov. 16-20, 2002, pp. 354-363, ACM, New York, NY, USA.

Computer Business Review, Polycom expands video integration for Microsoft unified, cbronline.com, Feb. 8, 2010, pp. 2.

Drucker, S. M., Intelligent camera control for graphical environments, Massachusetts Institute of Technology, Ph.D Thesis, Jun. 1994, pp. 1-207.

Gadget Crunch, Samsung 2263DX with tandem 7-inch monitor, Gadget Crunch, Jan. 6, 2008, p. 1.

Pritam, N., Tandberg first to demonstrate immersive three-screen telepresence interoperability with Cisco telepresence, AsiaNet, Feb. 2, 2010, p. 1.

Radvision Ltd., Video conferencing, the enterprise and you, Dec. 2008, pp. 1-39.

Tang, A., M. Pahud, K. Inkpen, H. Benko, J. C. Tang, B. Buxton, Three's company: Understanding communication channels in three-way distributed collaboration, Computer Supported Cooperative Work, CSCW 2010, Feb. 6-10, 2010, Savannah, Georgia, pp. 271-280.

Vidyo, Inc., The road to personal telepresence, retrieved from http://www.internet2.edu/workshops/commons/2010/01-28/Vidyol2Overview__2010__01__28.pdf, Jan. 28, 2010, pp. 1-20.

Rui, Y., A. Gupta, J. Grudin, L. HE, Automating lecture capture and broadcast: Technology and videography, Multimedia Syst., Jun. 2004, pp. 3-15, vol. 10, No. 1.

Ndje, T., U.S. Office Action, U.S. Appl. No. 12/907,244, Nov. 9, 2012, pp. 1-31.

Figueroa-Gibson, Gloryvid, U.S. Office Action, U.S. Appl. No. 12/970,951, Jul. 5, 2013.

"Office Action Issued in European Patent Application No. 11834832.5", Mailed Date: Oct. 16, 2016, 4 Pages.

"Search Report Issued in European Patent Application No. 11834832.5", Mailed Date: Sep. 14, 2015, 3 Pages.

* cited by examiner

OPTIMIZED TELEPRESENCE USING MOBILE DEVICE GESTURES

BACKGROUND

Due to factors such as economic globalization and ongoing advances in computing, data communication, and computer networking technologies, human society across the globe is becoming increasingly mobile. Additionally, businesses and families are becoming increasingly geographically distributed. As a result, people in different geographic locations have an increasing desire to collaborate and exchange information in a live, interactive manner without having to spend the time and money associated with traveling to a common geographic location. Videoconferencing is one commonly employed technique which provides for the live exchange of both audio and video information between two or more people who are situated remotely from one another and are linked by a communication network.

SUMMARY

This Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter.

Optimized telepresence technique embodiments described herein generally involve optimizing the telepresence of two or more users who are participating in a telepresence session. The users include a mobile user who is utilizing a mobile device (MD) having a display screen, and one or more remote users each of whom are utilizing a computer that is connected to the MD via a network. In one exemplary embodiment the MD receives live video of a first remote user over the network. Whenever the mobile user gestures with the MD using a first motion, video of the first remote user is displayed on the MD's display screen.

In another exemplary embodiment where the MD also has an audio output device, the MD receives live video and live audio of both the first remote user and a second remote user over the network. The MD also displays a workspace on the display screen and reproduces the audio of the first and second remote users via the audio output device in a default manner. Whenever the mobile user gestures with the MD using the first motion, video of the first remote user is displayed on the MD's display screen, and the audio of the first and second remote users is reproduced via the MD's audio output device in a manner that accentuates the first remote user. Whenever the mobile user gestures with the MD using a second motion, video of the second remote user is displayed on the MD's display screen, and the audio of the first and second remote users is reproduced via the MD's audio output device in a manner that accentuates the second remote user.

DESCRIPTION OF THE DRAWINGS

The specific features, aspects, and advantages of the optimized telepresence (OT) technique embodiments described herein will become better understood with regard to the following description, appended claims, and accompanying drawings where:

DETAILED DESCRIPTION

In the following description of optimized telepresence (OT) technique embodiments reference is made to the accompanying drawings which form a part hereof, and in which are shown, by way of illustration, specific embodiments in which the OT technique can be practiced. It is understood that other embodiments can be utilized and structural changes can be made without departing from the scope of the OT technique embodiments.

The term "mobile device (MD)" is used herein to refer to a handheld computing device that is carried by a user. As such, MDs are generally "pocket-sized." Exemplary MDs include, but are not limited to, smartphones, tablet computers and personal digital assistants. Accordingly, the term "mobile user" is used herein to refer to a user who is on the move (i.e., who is traveling away from their home or workplace) and is utilizing an MD. The term "non-mobile computing device" is used herein to refer to a computing device that is larger than an MD and thus is generally not handheld. Exemplary non-mobile computing devices include, but are not limited to, desktop personal computers (PCs) and laptop computers. Accordingly, the term "non-mobile user" is used herein to refer to a user who is not on the move but rather is located either at home or at their workplace (among other places) and thus is utilizing a non-mobile computing device.

The term "sector" is used herein to refer to a segmented region of a display device or a display screen in which a particular type of graphical user interface (GUI) and/or information is displayed, or a particular type of function is performed. If a person is right-handed then their right hand is referred to herein as their "dominant hand" and their left hand is referred to herein as their "non-dominant hand." Similarly, if a person is left-handed then their left hand is referred to herein as their dominant hand and their right hand is referred to herein as their non-dominant hand.

1.0 Optimized Telepresence Using Mobile Device (MD) Gestures

Telepresence generally refers to a collection of different computing and communication techniques that enable a particular user who physically resides in one location to feel as if they are actually present in one or more remote locations where other users reside. Telepresence also enables the particular user to appear to the other users (who are remotely located therefrom) as if the particular user is actually present in each remote location. In other words, telepresence makes each user feel as though they are in the same room as the other users who are remotely located therefrom. Telepresence also extends each user's sensory-motor facilities and problem solving abilities to the remote locations of the other users. As such, the term "telepresence session" is used herein to refer to an advanced type of videoconference that incorporates telepresence techniques.

Generally speaking, the OT technique embodiments described herein optimize the telepresence of two or more users who are remotely located from each other and are participating in a telepresence session. The participating users include at least one mobile user who is utilizing an MD that is connected to a network to participate in the session. The participating users can also include one or more non-mobile users each of whom is utilizing a non-mobile computing device that is also connected to the network to participate in the session. As will be appreciated from the more detailed description that follows, the OT technique embodiments generally optimize the telepresence of each mobile user and each non-mobile user that is participating in the session. The OT technique embodiments also provide for the live exchange of audio, video and other types of information between the various users participating in the session.

The OT technique embodiments described herein are advantageous for a variety of reasons including, but not limited to, the following. The OT technique embodiments allow a mobile user to participate in a telepresence session with other remotely located mobile and non-mobile users in an efficient and affordable manner regardless of where in the world the various users happen to be located. In other words, the mobile users do not have to spend the time and money associated with finding and utilizing a public videoconference service and/or related facility in order to be able to participate in the session. The OT technique embodiments are also easy to deploy and easy to use. The OT technique embodiments are also compatible with various conventional MDs, conventional non-mobile computing devices and conventional communication networks.

As is appreciated in the art of behavioral science, a significant amount of communication between people occurs via nonverbal cues. Examples of these nonverbal cues include a person's eye gaze direction, facial expressions, "body language," hand gestures, other body gestures, and the like. The OT technique embodiments described herein are further advantageous in that they generally optimize the quality, effectiveness and productivity of communication and collaborative interaction between the mobile and non-mobile users participating in the telepresence session by sensing nonverbal cues from each user and transmitting these cues to the other users. More particularly and as will be described in more detail hereafter, the OT technique embodiments allow face-to-face interaction between each mobile and non-mobile user during the session, where this contact/interaction can take place in conjunction with other collaborative activities such as collaboratively viewing, manipulating and annotating one or more data objects in a shared workspace, among others. The OT technique embodiments also sense each user's nonverbal behavioral cues, transmit these cues to the other users participating in the session, and utilize the received cues to dynamically adapt how the live audio, live video and other information is presented to each user. As a result, the OT technique embodiments create a rich, compelling and satisfying telepresence session experience for each mobile user (despite the small physical size of the MD) and each non-mobile user that is participating in the session.

1.1 Architectural Framework

Figure 1:
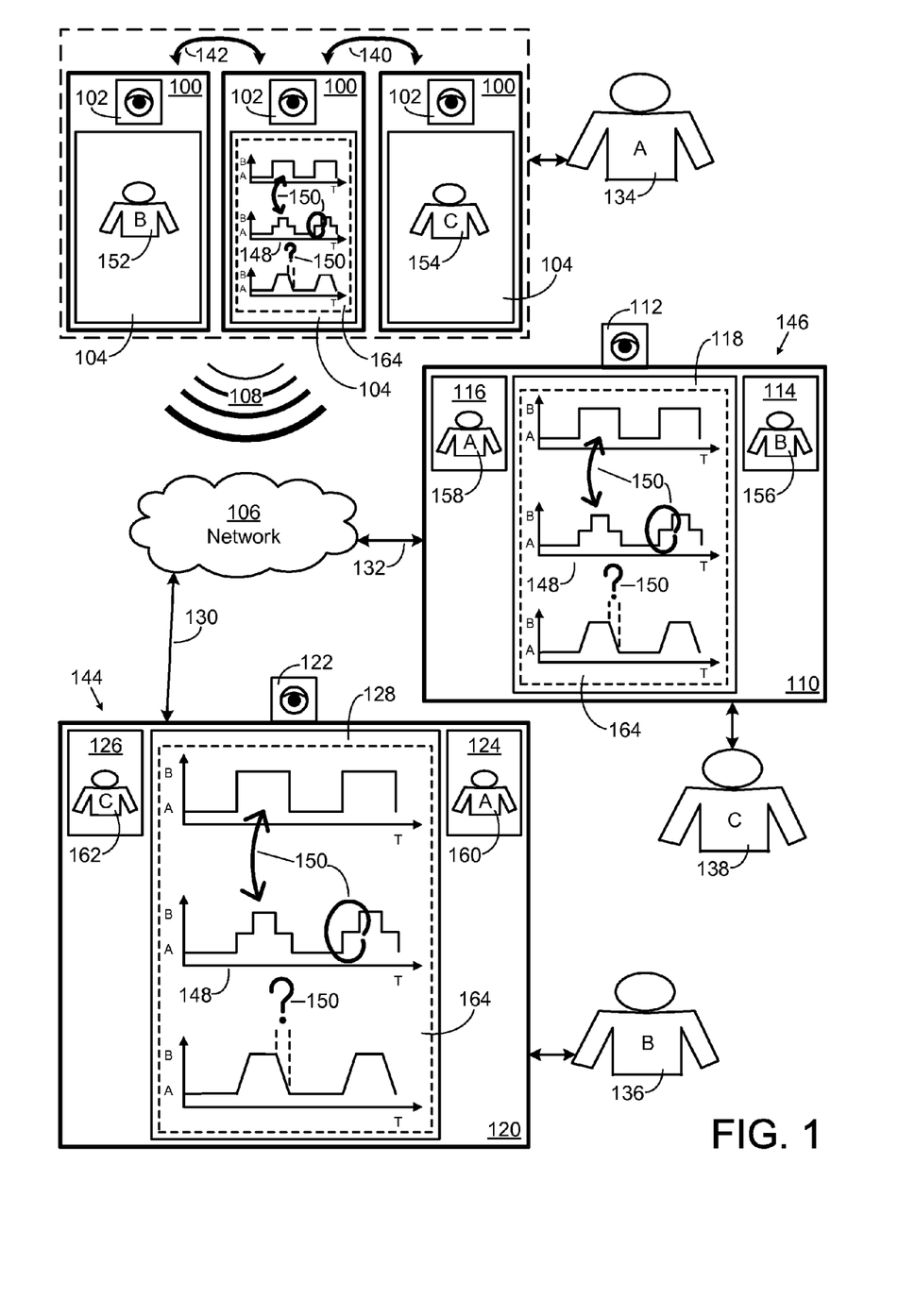
FIG. 1 is a diagram illustrating an exemplary embodiment, in simplified form, of an architectural framework for implementing the OT technique embodiments described herein.

FIG. 1 illustrates an exemplary embodiment, in simplified form, of an architectural framework for implementing the OT technique embodiments described herein. Generally speaking and as described heretofore, the OT technique embodiments optimize the telepresence of two or more users who are remotely located from each other and are participating in a telepresence session. The participating users include at least one mobile user who is utilizing an MD that is connected to a network. The participating users can also include one or more non-mobile users each of whom is utilizing a non-mobile computing device that is also connected to the network. The particular framework exemplified in FIG. 1 illustrates a telepresence session between three users (i.e., a three-way session). A mobile user A 134 is utilizing an MD 100 to participate in the session. A first remote user B 136 is utilizing a first non-mobile computing device 144 to participate in the session. A second remote user C 138 is utilizing a second non-mobile computing device 146 to participate in the session. The MD 100, first non-mobile computing device 144 and second non-mobile computing device 146 are interconnected by a distributed communication network 106.

Referring again to FIG. 1, the MD 100 is connected to the distributed communication network 106 via a conventional wireless connection 108. As is appreciated in the art of communication networks, the network 106 can be either a public communication network such as the Internet (among others), or a private communication network such as an intranet (among others). The wireless connection 108 can be implemented in various ways depending on the particular type of MD 100 that is being utilized by mobile user A 134 and the types of wireless network service that are available in the particular location where user A happens to be situated during the telepresence session. By way of example but not limitation, the wireless connection 108 can be a Wi-Fi local area network (LAN) connection to a Wi-Fi access point device (not shown). The wireless connection 108 can also be a cellular wide area network (WAN) connection which supports one or more different mobile telecommunication data services such as GPRS (general packet radio service—also known as "2.5G"), EDGE (enhanced data rates for GSM (global system for mobile communications) evolution—also known as "2.75G"), and 3G (third generation).

Referring again to FIG. 1, the MD 100 includes various functional components which are integrated there-within. Examples of these functional components include, but are not limited to, a compact display screen 104, an audio capture device (not shown) (such as a compact microphone and the like), a front-facing video capture device 102 (such as a compact video camera and the like), and an audio output device (not shown) (such as one or more compact loudspeakers and the like). In an exemplary embodiment of the OT technique described herein, the MD's display screen 104 is touch-sensitive. An alternate embodiment of the OT technique is also possible where the MD's 100 display screen 104 is not touch-sensitive. The MD 100 may also include additional functionality integrated there-within that enables it to operate as a telephone.

Referring again to FIG. 1, the MD 100 also includes motion-sensing functionality. In an exemplary embodiment of the OT technique described herein, the motion-sensing functionality is provided by a dedicated motion-sensing device (not shown) that is also integrated within the MD 100. This dedicated motion-sensing device is described in more detail hereafter. An alternate embodiment of the OT technique is also possible where the motion-sensing functionality is provided using the video capture device 102 combined with conventional video processing methods. Another alternate embodiment of the OT technique is also possible where the motion-sensing functionality is provided using a combination of the dedicated motion-sensing device, video capture device 102 and conventional video processing methods.

Referring again to FIG. 1, the MD's front-facing video capture device 102 captures a live video stream (hereafter simply referred to as "live video") of whatever is in front of the MD's display screen 104. During a telepresence session mobile user A 134 will generally either be holding the MD 100 in their non-dominant hand, or will place the MD on a table top in front of them. In either case, user A 134 will generally be looking at the display screen 104 during the telepresence session so that the video capture device 102 will generally capture live video of user A's head and torso. The live video of user A includes various types of information such as user A's eye gaze direction, facial expressions, body language, hand gestures, other body gestures, and the like. The live video of user A is transmitted over the distributed communication network 106 to both the first and second non-mobile computing devices 144/146. The MD 100 receives similar live video of the first remote user B and second remote user C over the network 106 from the first and second non-mobile computing devices 144/146 respectively.

Referring again to FIG. 1, the MD's 100 display screen 104 can display various types of information including, but not limited to, live video of the first remote user B 152 that is received over the distributed communication network 106 from the first non-mobile computing device 144, or live video of the second remote user C 154 that is received over the network from the second non-mobile computing device 146, or a workspace 164. Generally speaking, the workspace 164 displayed on the MD 100 can be either a shared workspace (as shown in FIG. 1) or a personal workspace (not shown). As will be described in more detail hereafter, user A 134 can change what is displayed on the MD's display screen 104 by gesturing 140/142 with the MD 100 in prescribed ways.

Referring again to FIG. 1, the MD's 100 audio capture device captures live audio emanating from the mobile user A 134, such as user A's voice, and the like. The captured live audio is transmitted over the distributed communication network 106 to both the first and second non-mobile computing devices 144/146. The MD 100 receives similar captured live audio over the network 106 from the first and second non-mobile computing devices 144/146.

Generally speaking and referring again to FIG. 1, the MD's 100 audio output device includes one or more audio channels which are used to reproduce the live audio captured from the first remote user B 136 that is received over the network 106 from the first non-mobile computing device 144, and the live audio captured from the second remote user C 138 that is received over the network from the second non-mobile computing device 146. As will be described in more detail hereafter, the OT technique embodiments described herein can perform this audio reproduction in a variety of ways based on the particular configuration of the MD's audio output device. In one embodiment of the OT technique the MD's audio output device has a single audio channel (not shown) which can be connected either to a single compact loudspeaker that is integrated within the MD 100, or to a mono audio output jack on the MD, or both. It will be appreciated that an external loudspeaker or earphone can be connected to the mono audio output jack. In another embodiment of the OT technique the MD's audio output device has both a left audio channel (not shown) and a right audio channel (not shown). The left and right audio channels can be connected either to first and second compact loudspeakers respectively which are integrated within the MD 100 (where the first and second loudspeakers are located on the left and right sides of the MD respectively), or to a stereo audio output jack on the MD, or both. It will be appreciated that a pair of headphones or a pair of external loudspeakers can be connected to the stereo audio output jack.

Referring again to FIG. 1, the first non-mobile computing device 144 is connected to the distributed communication network 106 via either a conventional wired connection 130 or a conventional wireless connection (not shown). The first non-mobile computing device 144 includes various functional components such as a display device 120, an audio capture device (not shown), a video capture device 122, and an audio output device (not shown), among others. The video capture device 122 is oriented to capture live video of whatever is in front of the display device 120. As non-the mobile user B 136 will generally be looking at the display device 120 during the telepresence session, the video capture device 122 will generally capture live video of user B's head and torso. The live video of user B includes the various types of information described heretofore, and is transmitted over the network 106 to both the MD 100 and the second non-mobile computing device 146. The first non-mobile computing device 144 receives similar live video of the mobile user A 160 and second remote user C 162 over the network 106 from the MD 100 and second non-mobile computing device 146 respectively.

Referring again to FIG. 1, the first non-mobile computing device's 144 display device 120 can display various types of information. In the OT technique embodiment exemplified in FIG. 1 the live video of mobile user A 160 is displayed within a first sector 124 of the display device 120. The live video of the second remote user C 162 is displayed within a second sector 126 of the display device 120. A third sector 128 of the display device 120 generally serves as a workspace for the first remote user B 136. Various types of information can be displayed within the third sector 128 including, but not limited to, the aforementioned shared workspace 164 (as shown in FIG. 1).

Referring again to FIG. 1, the first non-mobile computing device's 144 audio capture device captures live audio emanating from the first remote user B 136, such as user B's voice, and the like. The captured live audio is transmitted over the distributed communication network 106 to both the MD 100 and the second non-mobile computing device 146. The first non-mobile computing device 144 receives similar captured live audio over the network 106 from both the MD 100 and the second non-mobile computing device 146.

Generally speaking and referring again to FIG. 1, the first non-mobile computing device's 144 audio output device includes one or more audio channels which are used to reproduce the live audio captured from mobile user A 134 that is received over the network 106 from the MD 100, and the live audio captured from the second remote user C 138 that is received over the network from the second non-mobile computing device 146. The OT technique embodiments described herein can perform this audio reproduction in a variety of ways that will be described in more detail hereafter. The audio output device can be configured in a variety of ways including, but not limited to, those described heretofore for the MD 100.

Referring again to FIG. 1, the second non-mobile computing device 146 is connected to the distributed communication network 106 via either a conventional wired connection 132 or a conventional wireless connection (not shown). The second non-mobile computing device 146 includes various functional components such as a display device 110, an audio capture device (not shown), a video capture device 112, and an audio output device (not shown), among others. The video capture device 112 is oriented to capture live video of whatever is in front of the display device 110. As the non-mobile user C 138 will generally be looking at the display device 110 during the telepresence session, the video capture device 112 will generally capture live video of user C's head and torso. The live video of user C includes the various types of information described heretofore, and is transmitted over the network 106 to both the MD 100 and the first non-mobile computing device 144. The second non-mobile computing device 146 receives similar live video of the mobile user A and first remote user B over the network 106 from the MD 100 and the first non-mobile computing device 144 respectively.

Referring again to FIG. 1, the second non-mobile computing device's 146 display device 110 can display various types of information. In the OT technique embodiment exemplified in FIG. 1 the live video of mobile user A 158 is displayed within a first sector 116 of the display device 110. The live video of the first remote user B 156 is displayed within a second sector 114 of the display device 110. A third sector 118 of the display device 110 generally serves as a workspace for the second remote user C 138. Various types of information can be displayed within the third sector 118 including, but not limited to, the aforementioned shared workspace 164 (as shown in FIG. 1).

Referring again to FIG. 1, the second non-mobile computing device's 146 audio capture device captures live audio emanating from the second remote user C 138, such as user C's voice, and the like. The captured live audio is transmitted over the distributed communication network 106 to both the MD 100 and the first non-mobile computing device 144. The second non-mobile computing device 146 receives similar captured live audio over the network 106 from both the MD 100 and the first non-mobile computing device 144.

Generally speaking and referring again to FIG. 1, the second non-mobile computing device's 146 audio output device includes one or more audio channels which are used to reproduce the live audio captured from mobile user A 134 that is received over the network 106 from the MD 100, and the live audio captured from the first remote user B 136 that is received over the network from the first non-mobile computing device 144. The OT technique embodiments described herein can perform this audio reproduction in a variety of ways which are similar to that of the first non-mobile computing device 144. The audio output device can be configured in a variety of ways which are also similar to that of the first non-mobile computing device 144.

It is noted that an alternate embodiment of the OT technique described herein is possible where one or more of the non-mobile computing devices includes a separate display device, a separate audio capture device, a separate video capture device and a separate audio output device for each remote user participating in the session, and also includes another display device on which the workspace is displayed. In such an embodiment the separate display, audio capture, video capture and audio output devices for each remote user can be physically integrated together such that they serve as a surrogate for the remote user.

Referring again to FIG. 1, the MD's 100 aforementioned dedicated motion-sensing device senses the spatial orientation of the MD and measures the direction (among other things) of any physical movement of the MD. As will be described in more detail hereafter, the MD 100 uses this spatial orientation and movement information for various purposes such as controlling its GUI, and dynamically adapting how the live video of remote user B 136 and remote user C 138, and the live audio from user B and user C are presented to mobile user A 134. An accelerometer is commonly employed as the dedicated motion-sensing device, although other types of motion-sensing devices could also be used.

The OT technique embodiments described herein include, but are not limited to, an MD gesturing feature, a gaze awareness feature, a spatialized audio feature, and various workspace features. As will be appreciated from the more detailed description of these features that follows, these features both individually and collectively serve to optimize the telepresence of each mobile user and each non-mobile user that is participating in the telepresence session.

1.2 Mobile Device (MD) Gesturing

Generally speaking, the MD gesturing feature of the OT technique embodiments described herein allows a given mobile user to change what is displayed on the MD's display screen during a telepresence session by gesturing with the MD in prescribed ways. As such, the MD gesturing feature can operate on each MD being used in the session.

Figure 2:
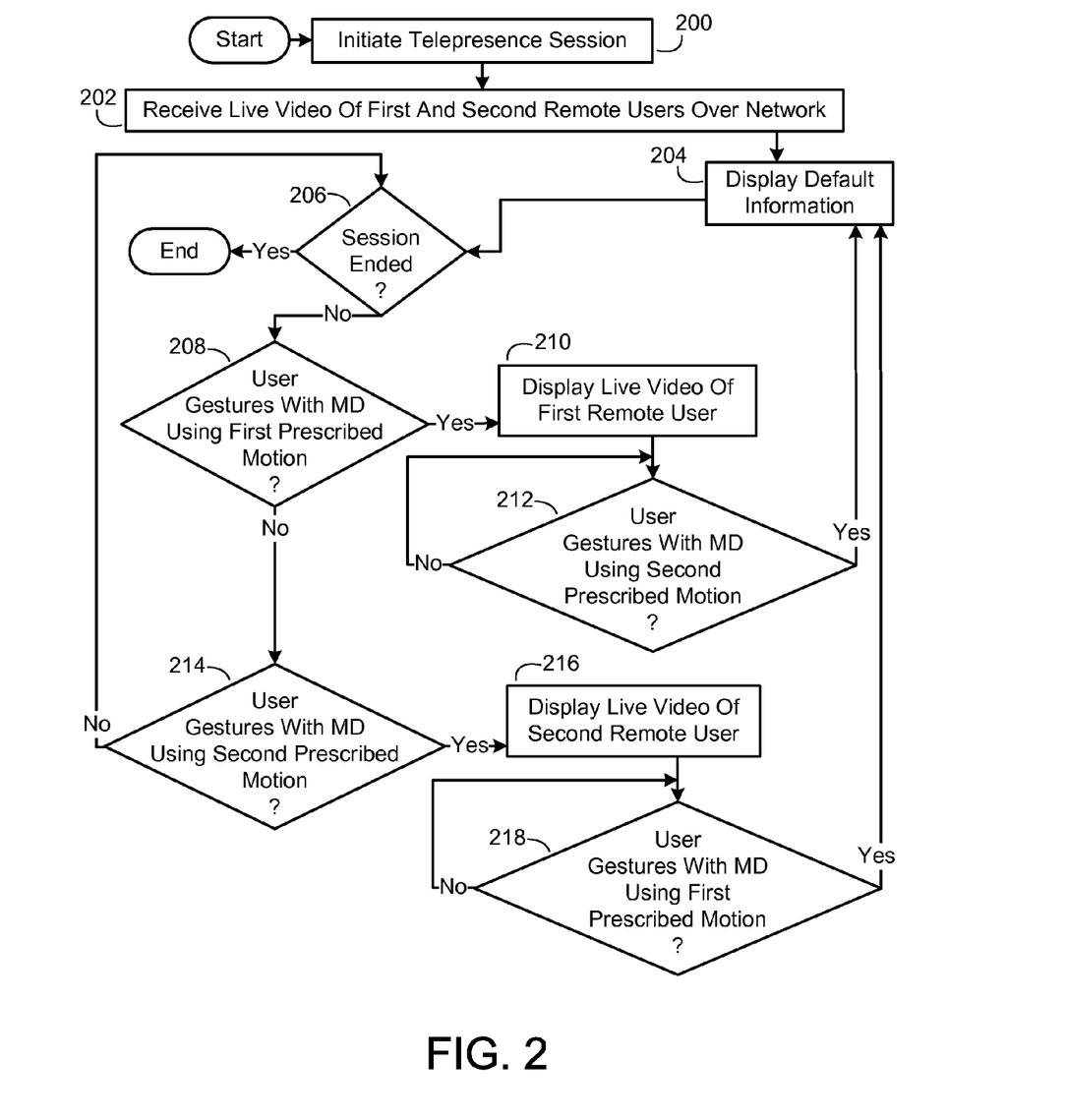
FIG. 2 is a flow diagram illustrating an exemplary embodiment, in simplified form, of a process for implementing a mobile device (MD) gesturing feature of the OT technique embodiments described herein.

FIG. 2 illustrates an exemplary embodiment, in simplified form, of a process for implementing the MD gesturing feature on an MD which is being used by a mobile user to participate in a telepresence session with a first remote user and a second remote user. As exemplified in FIG. 2, the process starts in block 200 with the initiation of the telepresence session. Live video of the first and second remote users is then received over the network (block 202). Default information is then displayed on the MD's display screen (block 204). In an exemplary embodiment of the OT technique described herein this default information is a workspace which, as described heretofore, can be either a shared workspace or a personal workspace. Assuming the session is still active (block 206, No), whenever the default information is displayed and the mobile user gestures with the MD using a first prescribed motion (block 208, Yes), the live video of the first remote user will be displayed on the MD's display screen (block 210). This action of displaying the live video of the first remote user can optionally include providing haptic feedback to the mobile user to notify them that what is displayed on the display screen has changed. If the mobile user subsequently gestures with the MD using a second prescribed motion (block 212, Yes), the default information will be re-displayed on the MD's display screen (block 204). This action of re-displaying the default information can optionally include providing haptic feedback to the mobile user to notify them that what is displayed on the display screen has again changed.

Referring again to FIG. 2, whenever the default information is displayed and the mobile user gestures with the MD using the second prescribed motion (block 214, Yes), the live video of the second remote user will be displayed on the MD's display screen (block 216). This action of displaying the live video of the second remote user can optionally include providing haptic feedback to the mobile user for the reason just provided. If the mobile user subsequently gestures with the MD using the first prescribed motion (block 218, Yes), the default information will be re-displayed on the MD's display screen (block 204). The actions of blocks 204-218 are repeated until the end of the telepresence session (block 206, Yes). The OT technique embodiments described herein are advantageous in that they permit the entire display screen of the MD to be used for the workspace (i.e., the screen real estate available for the workspace is not diminished by the live video of the remote users). The OT technique embodiments are also advantageous in that they provide the mobile user with a perception of spatial location between the remote users and the workspace.

The aforementioned haptic feedback can be provided to the mobile user either in the middle of the transition between the old content that was previously being displayed on the display screen and the new content that is currently being displayed, or once the new content is fully displayed. The haptic feedback can also be provided to the mobile user in various ways. In one embodiment of the OT technique described herein where the MD includes a vibration motor which is optionally integrated within the MD, the haptic feedback can be provided by stimulating the vibration motor for a prescribed brief period of time. In an exemplary embodiment of the OT technique this period of time is 0.3 seconds. In another embodiment of the OT technique the haptic feedback can be accompanied by either audio feedback, or video feedback, or both audio and video feedback.

In one intuitive embodiment of the OT technique described herein the first prescribed motion is a leftward motion and the second prescribed motion is a rightward motion (from the perspective of the mobile user who is holding the MD). In one implementation of this embodiment the leftward motion is the MD being tilted about its left edge (i.e., the mobile user rotating the MD counterclockwise about its upward-facing vertical axis), and the rightward motion is the MD being tilted about its right edge (i.e., the mobile user rotating the MD clockwise about its upward-facing vertical axis). In another implementation of this embodiment the leftward motion is the MD being moved horizontally leftward from its vertical axis and the rightward motion is the MD being moved horizontally rightward from its vertical axis.

In another intuitive embodiment of the OT technique described herein the first prescribed motion is an upward motion and the second prescribed motion is a downward motion (from the perspective of the mobile user who is holding the MD). In one implementation of this embodiment the upward motion is the MD being tilted about its top edge (i.e., the mobile user rotating the MD counterclockwise about its right-facing horizontal axis), and the downward motion is the MD being tilted about its bottom edge (i.e., the mobile user rotating the MD clockwise about its right-facing horizontal axis). In another implementation of this embodiment the upward motion is the MD being moved vertically upward from its horizontal axis and the downward motion is the MD being moved vertically downward from its horizontal axis.

The determination of which remote user is displayed when the mobile user gestures with the MD using the first prescribed motion versus the second prescribed motion is generally arbitrary. The MD makes this determination when the telepresence session is initiated, and generally maintains this determination for the duration of the telepresence session. The MD then transmits information over the network to the computing device of each remote user specifying the particular remote user whose live video is displayed upon the mobile user gesturing with the MD using the first motion, and also specifying the other particular remote user whose live video is displayed upon the mobile user gesturing with the MD using the second motion. Whenever the computing device of a given remote user has a single display device/screen, the computing device utilizes this information to determine where on its display device/screen the live video of each remote user is to be displayed. Whenever the computing device of a given remote user has a separate display device for each remote user participating in the session, and also has another display device on which the workspace is displayed, the computing device utilizes this information to determine on which display device the live video of each remote user is to be displayed. In both of these cases, the computing device makes this determination in a manner that maintains an intuitive and consistent spatial interrelationship between the different users participating in the telepresence session. It will thus be appreciated that the mobile user's gesturing with the MD using the first prescribed motion in order to see the live video of the first remote user, and gesturing with the MD using the second prescribed motion in order to see the live video of the second remote user serves as a spatial metaphor for the remote users participating in a telepresence session, where this metaphor is both natural and intuitive for the mobile user.

An exemplary embodiment of such a consistent spatial interrelationship between the different users is illustrated in FIG. 1 as follows. The MD determines that remote user B's live video is displayed when the mobile user A tilts the MD about its left edge, and remote user C's live video is displayed when user A tilts the MD about its right edge. As such, user B is metaphorically located to user A's left, and user C is metaphorically located to user A's right. Upon receiving this information from the MD, the computing device of user B determines that user A's live video is to be displayed on the right side of its display device and user C's live video is to be displayed on the left side of its display device, and the computing device of user C determines that user B's live video is to be displayed on the right side of its display device and user A's live video is to be displayed on the left side of its display device.

1.3 Gaze Awareness

Generally speaking, the gaze awareness feature of the OT technique embodiments described herein optimizes the telepresence of each user that is participating in the telepresence session by computing gaze information that specifies what a given local user is currently looking at on their display device/screen and transmitting the gaze information over the network to the remote MD or non-mobile computing device of each remote user. Each MD and non-mobile computing device uses the gaze information it receives to dynamically adapt how information is displayed on its display device/screen. As such, the gaze awareness feature can operate on each MD and on each non-mobile computing device being used in the session. The gaze awareness feature generally includes a transmission component and a reception component, both of which will now be described in more detail.

Figure 3:
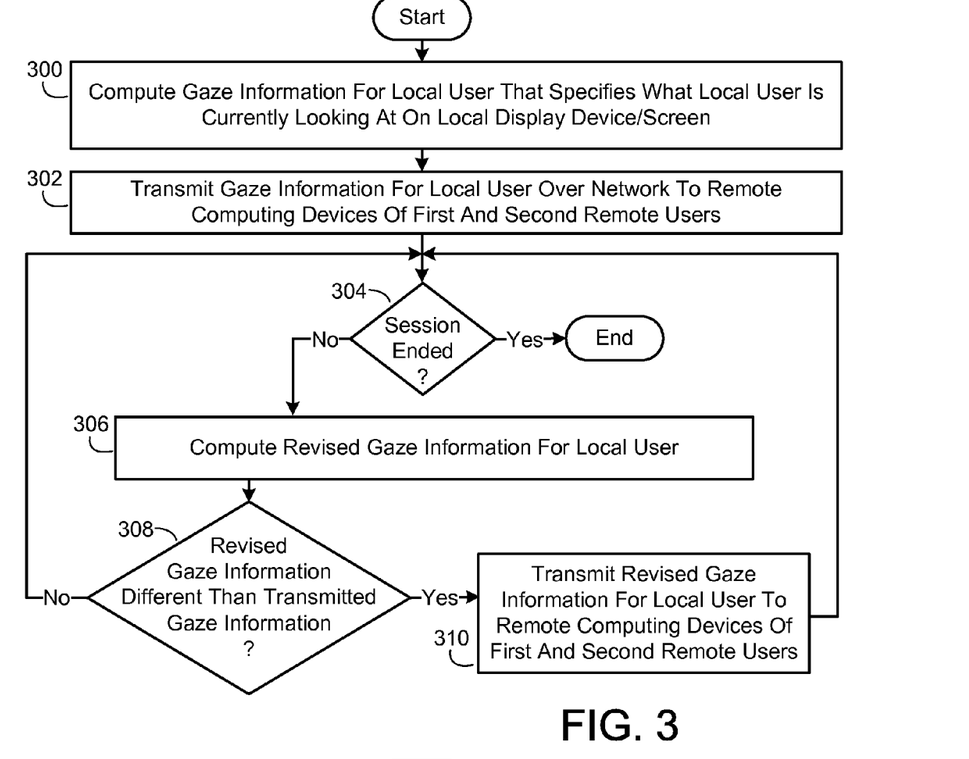
FIG. 3 is a flow diagram illustrating an exemplary embodiment, in simplified form, of a process for implementing a transmission component of a gaze awareness feature of the OT technique embodiments described herein.

FIG. 3 illustrates an exemplary embodiment, in simplified form, of a process for implementing the transmission component of the gaze awareness feature on a local computing device which is being used by a local user to participate in a telepresence session with a first remote user and a second remote user. It is noted that the local computing device can be either an MD or a non-mobile computing device. As exemplified in FIG. 3, the process starts in block 300 with the local computing device computing gaze information for the local user that specifies what the local user is currently looking at on the local display device/screen. In the case where the local computing device is an MD this computation involves simply specifying what is currently being displayed on the MD's display screen. In the case where the local computing device is a non-mobile computing device having just a single display device and a single video capture device, this computation can involve processing the live video of the local non-mobile user that is captured by the single video capture device. If the local user is currently looking at live video of a particular remote user on the local display device/screen, the computed gaze information can optionally include the name of the particular remote user.

Referring again to FIG. 3, once the gaze information for the local user is computed (block 300), it is then transmitted over the network to the remote computing devices of the first and second remote users (block 302). Whenever the telepresence session is still active (block 304, No), the local computing device continues to compute revised gaze information for the local user (block 306). Whenever the revised gaze information is different than the transmitted gaze information (in other words, with particular regard to the MD, whenever what the mobile user is looking at on the MD's display screen changes) (block 308, Yes), the revised gaze information for the local user will be transmitted over the network to the remote computing devices of the first and second remote users (block 310). The actions of blocks 304-310 are repeated until the end of the telepresence session (block 304, Yes).

Figure 4:
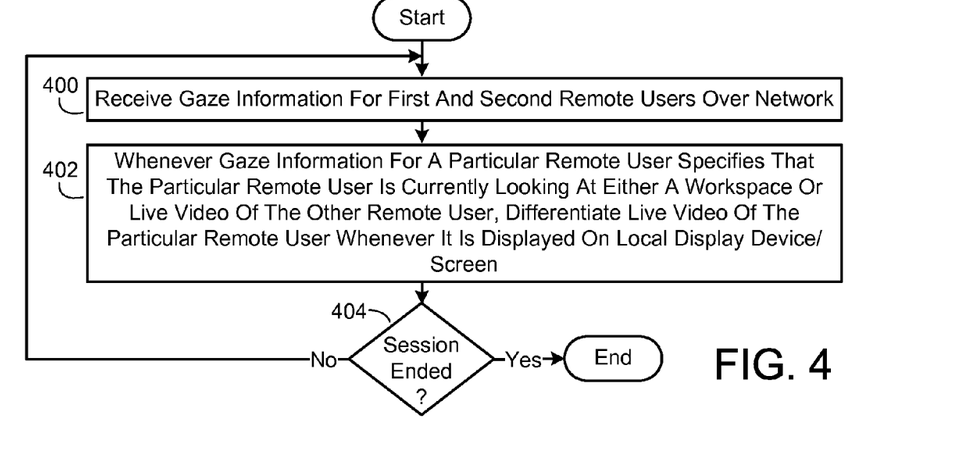
FIG. 4 is a flow diagram illustrating an exemplary embodiment, in simplified form, of a process for implementing a reception component of the gaze awareness feature on an MD.

FIG. 4 illustrates an exemplary embodiment, in simplified form, of a process for implementing the reception component of the gaze awareness feature on a local computing device which is being used by a local user to participate in a telepresence session with a first remote user and a second remote user. The local computing device can again be either an MD or a non-mobile computing device. As exemplified in FIG. 4, the process starts in block 400 with the local computing device receiving gaze information for the first and second remote users over the network, where this information specifies what the first and second remote users are each currently looking at on their respective display device/screen. Whenever the gaze information for a particular remote user specifies that the particular remote user is currently looking at either a workspace or live video of the other remote user, the live video of the particular remote user will be differentiated whenever it is displayed on the local display device/screen (block 402). The actions of blocks 400 and 402 are repeated until the end of the telepresence session (block 404, Yes).

Generally speaking, the just mentioned video differentiation is implemented in a manner that indicates to the local user that the particular remote user whose live video is being differentiated is not looking at the local user. More particularly, in one embodiment of the OT technique described herein the video differentiation is implemented by blurring the video of the particular remote user. Other OT technique embodiments are also possible where the video differentiation is implemented in other ways. By way of example but not limitation, whenever the gaze information for the particular remote user specifies that the particular remote user is currently looking at live video of the other remote user, the live video of the particular remote user can be tilted to give the local user the impression that the particular remote user is looking in the direction of the other remote user.

1.4 Spatialized Audio

Generally speaking, the spatialized audio feature of the OT technique embodiments described herein further optimizes the telepresence of each user that is participating in the telepresence session by dynamically adapting how the aforementioned live audio that is received over the network from the MD or non-mobile computing device of each remote user is presented to a mobile user based on what is currently being displayed on the MD's display screen. As such, the spatialized audio feature can operate on each MD being used in the session.

Figure 5:
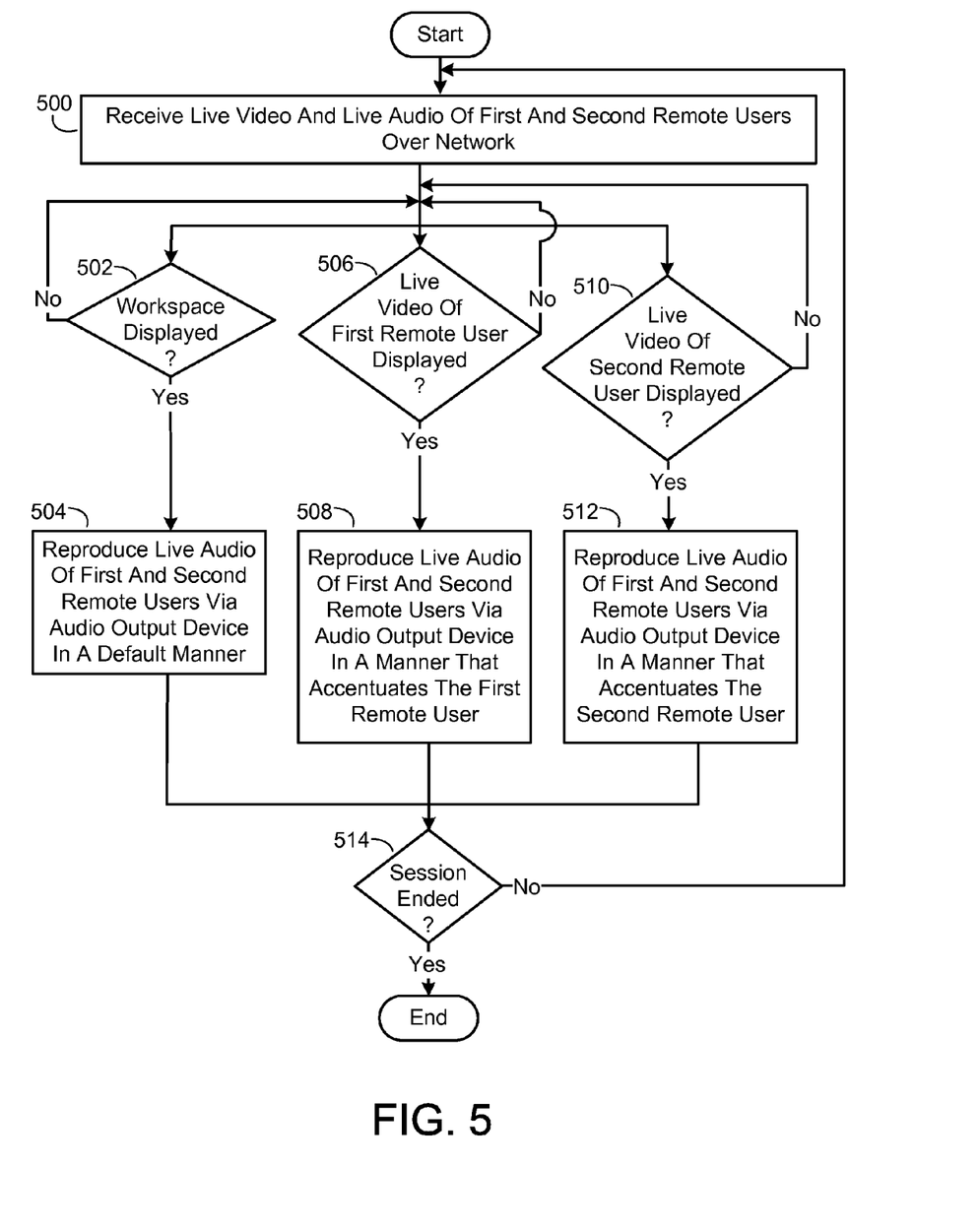
FIG. 5 is a flow diagram illustrating an exemplary embodiment, in simplified form, of a process for implementing a spatialized audio feature of the OT technique embodiments described herein on an MD.

FIG. 5 illustrates an exemplary embodiment, in simplified form, of a process for implementing the spatialized audio feature on an MD which is being used by a mobile user to participate in a telepresence session with a first remote user and a second remote user. As exemplified in FIG. 5, the process starts in block 500 with live video and live audio of the first and second remote users being received over the network. Whenever the workspace is displayed on the MD's display screen (block 502, Yes), the live audio of the first and second remote users will be reproduced via the audio output device in a default manner (block 504) which will be described in more detail hereafter. Whenever the live video of the first remote user is displayed on the MD's display screen (block 506, Yes), the live audio of the first and second remote users will be reproduced via the audio output device in a manner (which will also be described in more detail hereafter) that accentuates the first remote user (block 508). Whenever the live video of the second remote user is displayed on the MD's display screen (block 510, Yes), the live audio of the first and second remote users will be reproduced via the audio output device in a manner (which will also be described in more detail hereafter) that accentuates the second remote user (block 512). The actions of blocks 500-512 are repeated until the end of the telepresence session (block 514, Yes).

Assuming the aforementioned situation where the MD's audio output device has both a left audio channel and a right audio channel, the action of reproducing the live audio of the first and second remote users via the audio output device in a default manner can be implemented as follows: the live audio of the first remote user can be reproduced through just the left audio channel, and the live audio of the second remote user can be reproduced through just the right audio channel. In this same situation, the action of reproducing the live audio of the first and second remote users via the audio output device in a manner that accentuates the first remote user can be implemented as follows: the live audio of the first remote user can be reproduced through both the left and right audio channels, and the live audio of the second remote user can be reproduced through just the right audio channel; the volume of the live audio of the second remote user can optionally also be reduced by a prescribed percentage. In this same situation, the action of reproducing the live audio of the first and second remote users via the audio output device in a manner that accentuates the second remote user can be implemented as follows: the live audio of the second remote user can be reproduced through both the left and right audio channels, and the live audio of the first remote user can be reproduced through just the left audio channel; the volume of the live audio of the first remote user can optionally also be reduced by the prescribed percentage. In an exemplary embodiment of the OT technique described herein, the prescribed percentage is 75%.

Assuming the aforementioned situation where the MD's audio output device has a single audio channel, the action of reproducing the live audio of the first and second remote users via the audio output device in a default manner can be implemented as follows: the live audio of the first remote user can be reproduced through the single audio channel at a first volume, and the live audio of the second remote user can also be reproduced through the single audio channel at the first volume. In this same situation, the action of reproducing the live audio of the first and second remote users via the audio output device in a manner that accentuates the first remote user can be implemented as follows: the live audio of the first remote user can be reproduced through the single audio channel at the first volume, and the live audio of the second remote user can be reproduced through the single audio channel at a second volume which is less than the first volume. In this same situation, the action of reproducing the live audio of the first and second remote users via the audio output device in a manner that accentuates the second remote user can be implemented as follows: the live audio of the second remote user can be reproduced through the single audio channel at the first volume, and the live audio of the first remote user can be reproduced through the single audio channel at the second volume. In an exemplary embodiment of the OT technique described herein, the second volume is 75% less than the first volume.

1.5 Workspace

Referring again to FIG. 1, this section provides a more detailed description of various features of the workspace 164 that can be displayed during a telepresence session. Generally speaking, the workspace can include either one or more data objects 148, or one or more annotations 150, or a combination of one or more data objects and one or more annotations. Exemplary data objects include, but are not limited to, documents, video, images, presentations, and other types of data which can be specific to a given application such as a calendar, email, and the like. As described heretofore, the workspace 164 displayed on the MD 100 can be either a shared workspace (as shown in FIG. 1) or a personal workspace (not shown). As exemplified in FIG. 1, the shared workspace can be collaboratively viewed, manipulated and annotated by the different users 134/136/138 participating in the telepresence session using conventional methods. In other words, any user 134/136/138 can display data objects in the shared workspace, and any user can generate annotations in the shared workspace, and these data objects and annotations can be collaboratively viewed, manipulated and annotated by the other users. The personal workspace is displayed on just the display screen 104 of mobile user A 134. In other words, the personal workspace can be viewed and manipulated by just the mobile user A 134.

In the aforementioned case where the MD's display screen is touch-sensitive, in one embodiment of the OT technique described herein the mobile user can manipulate and annotate the workspace displayed on the MD by utilizing a pointing device which physically contacts the MD's display screen. In one implementation of this embodiment the pointing device can be a pen that the mobile user holds in their dominant hand. In another implementation of this embodiment the pointing device can be one or more fingers on the mobile user's dominant hand. Additional implementations of this embodiment are also possible where other types of pointing devices are employed by the mobile user. In another embodiment of the OT technique the mobile user can manipulate the workspace by physically contacting the MD's display screen using one or more fingers on their dominant hand, and the mobile user can annotate the workspace by physically contacting the display screen using a pen that they hold in their dominant hand. In the case where the mobile user is holding the MD during a telepresence session, since they will generally be holding it in their non-dominant hand as described heretofore, their dominant hand will generally remain free to manipulate and annotate the workspace, and also to make hand gestures which are visible to the remote users participating in the session.

Generally speaking, whenever the workspace is the personal workspace and the MD's display screen is touch-sensitive, the mobile user can send information to a given remote user (who is participating in a telepresence session with the mobile user) by utilizing the pointing device on the screen to "flick" the information to the remote user. More particularly and by way of example but not limitation, assume that the MD determines that remote user B's live video is displayed when the mobile user A tilts the MD about its left edge, and remote user C's live video is displayed when user A tilts the MD about its right edge. In this case, upon user A touching a particular data object displayed on the MD's display screen and dragging the data object leftward along the screen, the MD will transmit the particular data object over the network to the computing device of user B. Upon user A touching a particular data object displayed on the MD's display screen and dragging the data object rightward along the screen, the MD will transmit the particular data object over the network to the computing device of user C.

2.0 Additional Embodiments

While the OT technique has been described by specific reference to embodiments thereof, it is understood that variations and modifications thereof can be made without departing from the true spirit and scope of the OT technique. By way of example but not limitation, although the OT technique embodiments have been described in the context of a telepresence session between three users who are remotely located from each other, where one of the users is utilizing an MD to participate in the session, the OT technique embodiments can also support a telepresence session between just two users. Furthermore, rather than the default information that is displayed on the MD's display screen at the outset of the telepresence session being a workspace, this default information can be a person space within which live video of a prescribed remote user (such as the most recent remote user to join the session) is displayed. Yet furthermore, rather than each different location having just a single user who is participating in the session, one or more of the locations can be a conventional, public teleconferencing room having more than one person there-within who is participating in the session. In this case, whenever a mobile user who is utilizing an MD to participate in the session displays live video being transmitted from the teleconferencing room, they can see either just a given person in the teleconferencing room that is currently talking, subset of the people in the room, or the entire collection of the people in the room depending on the current circumstances in the room.

Additionally, rather than the first/second prescribed motions being either leftward/rightward motions or upward/downward motions as described heretofore, the first/second prescribed motions can also be other types of motions. By way of example but not limitation, the first prescribed motion can be a northwest-ward diagonal motion and the second prescribed motion can be a southeast-ward diagonal motion. By way of further example, the first prescribed motion can be a southwest-ward diagonal motion and the second prescribed motion can be a northeast-ward diagonal motion. Furthermore, rather than manipulating and annotating the workspace displayed on the MD's display screen by utilizing a pointing device to physically contact the screen, the mobile user can manipulate/annotate the workspace by placing one or more fingers on their dominant hand in close proximity to the screen, thus generating a "finger shadow" on the screen, and then moving their fingers in an appropriate manner to articulate the desired manipulation/annotation.

Additionally, rather than the mobile user gesturing with their MD using the first prescribed motion to view the live video of the first remote user on the MD's display screen, and gesturing with their MD using the second prescribed motion to view the live video of the second remote user, the mobile user can also repetitively gesture with their MD using either just the first or just the second prescribed motions in order to sequentially display the live video of each remote user participating in the telepresence session. By way of example but not limitation, in an exemplary alternate embodiment of the OT technique described herein, upon a first leftward motion of the MD live video of the first remote user would be displayed, and upon a subsequent leftward motion of the MD live video of the second remote user would be displayed.

Consider a case where a mobile user and two non-mobile users are participating in a telepresence session. Each of the non-mobile users is utilizing a non-mobile computing device that includes a separate display device and a separate video capture device integrated therewith for each remote user participating in the session. Each non-mobile computing device also includes another display device on which the workspace is displayed. As described heretofore, each integrated display and video capture device serves as a surrogate for its associated remote user. In this case the aforementioned transmission component of the gaze awareness feature is unnecessary on the non-mobile computing devices for the following reason. Each non-mobile computing device can process the video of its user captured by each surrogate in order to determine if its user is currently looking at the surrogate, or the workspace, or another surrogate. If a given non-mobile computing device determines that its user is currently looking at the workspace, then the live video of its user can be differentiated by the non-mobile computing device before it is transmitted over the network to the computing devices of the two remote users. Accordingly, in this case it will be appreciated that the aforementioned reception component of the gaze awareness feature is unnecessary on the mobile user's MD.

The OT technique embodiments can also be scaled to support more than three users. In this situation and generally speaking, assuming one of the users is a mobile user who is utilizing an MD to participate in a telepresence session, when the session is initiated the MD generates an ordered list that includes each of the remote users that is participating in the session. The MD then divides the list in half, resulting in an ordered list of a first half of the remote users and an ordered list of a second half of the remote users. The MD then determines that live video of the first half of the remote users is displayed in a sequential manner when the mobile user gestures with the MD using the aforementioned first prescribed motion. The MD also determines that live video of the second half of the remote users is displayed in a sequential manner when the mobile user gestures with the MD using the aforementioned second prescribed motion. The MD then transmits information over the network to the computing devices of each of the remote users identifying the first half of the remote users whose live video is displayed upon the mobile user gesturing with the MD using the first motion, and also identifying the second half of the remote users whose live video is displayed upon the mobile user gesturing with the MD using the second motion. In the case where the computing device of a given remote user has just a single display device/screen, the computing device then utilizes this information to determine where on its display device/screen the live video of each remote user is to be displayed. In the case where the computing device of a given remote user has a separate display device and a separate audio output device for each remote user participating in the session, and also has another display device on which the workspace is displayed, the computing device then utilizes this information to determine on which display device the live video of each remote user is to be displayed, and on which audio output device the live audio of each remote user is to be reproduced. In both of these cases this determination is made in a manner that maintains an intuitive and consistent spatial interrelationship between the different users participating in the telepresence session. A more particular exemplary implementation of this situation will now be provided.

Assume a scenario where a mobile user is utilizing an MD to participate in a telepresence session with a first remote user, a second remote user, and a third remote user, each of whom is utilizing a computing device having just a single display device/screen. Also assume the MD determines that live video of the first and second remote users is displayed in a sequential manner when the mobile user tilts the MD about its left edge, and determines that live video of the third remote user is displayed when the mobile user tilts the MD about its right edge. In other words, whenever the default information is displayed on the MD's display screen and the mobile user tilts the MD about its left edge, the live video of the first remote user will be displayed on the MD's display screen. If the mobile user again tilts the MD about its left edge the live video of the second remote user will be displayed. If the mobile user then tilts the MD about its right edge the video of the first remote user will be re-displayed. If the mobile user again tilts the MD about its right edge the default information will be re-displayed. Whenever the default information is displayed on the MD's display screen and the mobile user tilts the MD about its right edge, the live video of the third remote user will be displayed. If the mobile user then tilts the MD about its left edge the default information will be re-displayed.

As such, in this scenario the first and second remote users are metaphorically located to the mobile user's left, and the third remote user is metaphorically located to the mobile user's right. Upon receiving this information from the MD, the computing device of the first remote user determines that the mobile user's live video is to be displayed on the right side of its display device/screen, and the second and third remote user's live video is to be displayed on the left side. The computing device of the second remote user determines that the first remote user's live video is to be displayed on the right side of its display device/screen, and the third remote user's and mobile user's live video is to be displayed on the left side. The computing device of the third remote user determines that the second remote user's live video is to be displayed on the right side of its display device/screen, and the first remote user's and mobile user's live video is to be displayed on the left side.

It is noted that any or all of the aforementioned embodiments can be used in any combination desired to form additional hybrid embodiments. Although the OT technique embodiments have been described in language specific to structural features and/or methodological acts, it is to be understood that the subject matter defined in the appended claims is not necessarily limited to the specific features or acts described heretofore. Rather, the specific features and acts described heretofore are disclosed as example forms of implementing the claims.

3.0 Computing Environment

This section provides a brief, general description of a suitable computing system environment in which portions of the OT technique embodiments described herein can be implemented. These OT technique embodiments are operational with numerous general purpose or special purpose computing system environments or configurations. Exemplary well known computing systems, environments, and/or configurations that can be suitable include, but are not limited to, personal computers (PCs), server computers, hand-held devices (such as mobile phones and the like), laptop devices, multiprocessor systems, microprocessor-based systems, set top boxes, programmable consumer electronics, network PCs, minicomputers, mainframe computers, distributed computing environments that include any of the aforementioned systems or devices, and the like.

Figure 6:
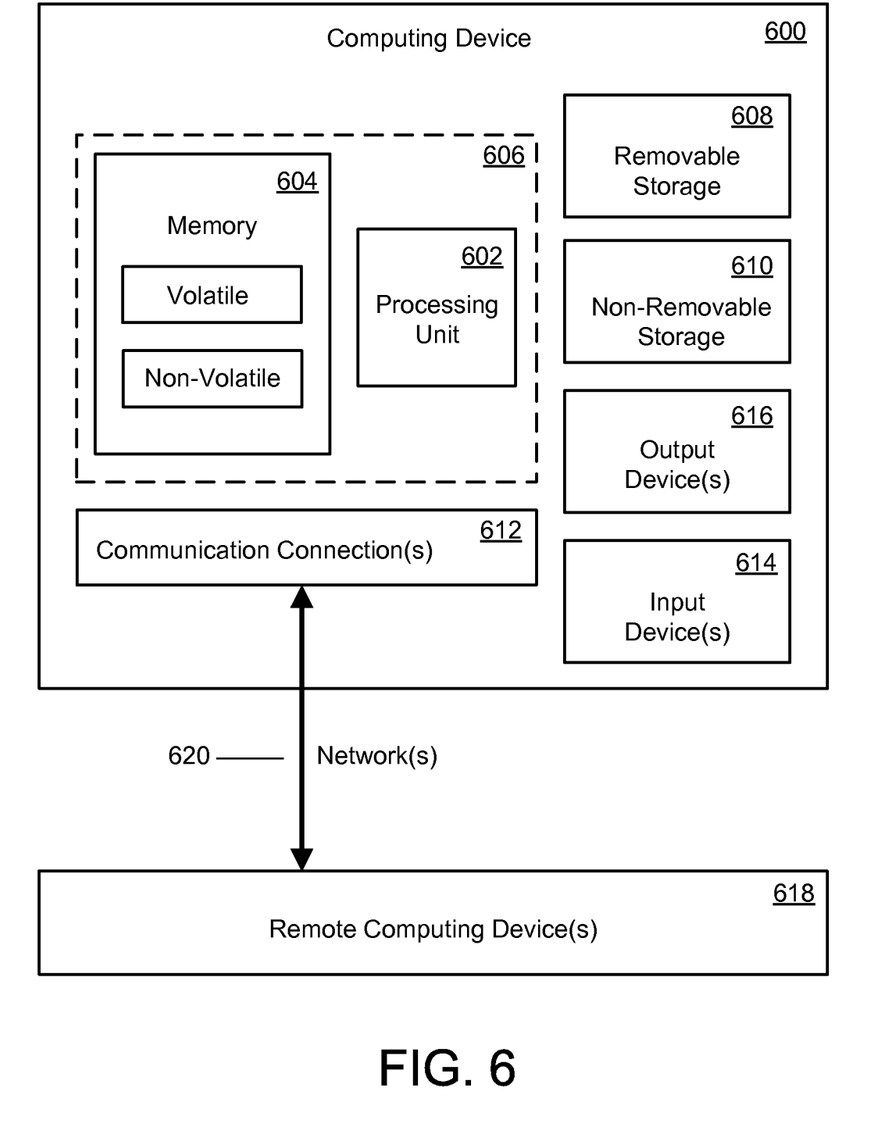
FIG. 6 is a diagram illustrating an exemplary embodiment, in simplified form, of a general purpose, network-based computing device which constitutes an exemplary system for implementing portions of the OT technique embodiments described herein.

FIG. 6 illustrates an exemplary embodiment, in simplified form, of a suitable computing system environment according to the OT technique embodiments described herein. The environment illustrated in FIG. 6 is only one example of a suitable computing system environment and is not intended to suggest any limitation as to the scope of use or functionality of the OT technique embodiments described herein. Neither should the computing system environment be interpreted as having any dependency or requirement relating to any one or combination of components exemplified in FIG. 6.

As exemplified in FIG. 6, an exemplary system for implementing portions of the OT technique embodiments described herein includes one or more computing devices, such as computing device 600. In its simplest configuration, computing device 600 typically includes at least one processing unit 602 and memory 604. Depending on the specific configuration and type of computing device, the memory 604 can be volatile (such as RAM), non-volatile (such as ROM and flash memory, among others) or some combination of the two. This simplest configuration is illustrated by dashed line 606.

As exemplified in FIG. 6, computing device 600 can also have additional features and functionality. By way of example, computing device 600 can include additional storage such as removable storage 608 and/or non-removable storage 610. This additional storage includes, but is not limited to, magnetic disks, optical disks and tape. Computer storage media typically embodies volatile and non-volatile media, as well as removable and non-removable media implemented in any method or technology. The computer storage media provides for storage of various information needed to operate the device 600 such as computer readable instructions associated with an operating system, application programs and other program modules, and data structures, among other things. Memory 604, removable storage 608 and non-removable storage 610 are all examples of computer storage media. Computer storage media includes, but is not limited to, RAM, ROM, EEPROM, flash memory or other memory technology, CD-ROM, digital versatile disks (DVD) or other optical disk storage technology, magnetic cassettes, magnetic tape, magnetic disk storage or other magnetic storage devices, or any other medium which can be used to store the desired information and which can be accessed by computing device 600. Any such computer storage media can be part of computing device 600.

As exemplified in FIG. 6, computing device 600 also includes a communications connection(s) 612 that allows the device to operate in a networked environment and communicate with a remote computing device(s), such as remote computing device(s) 618. Remote computing device(s) 618 can be any of the aforementioned computing systems, environments, and/or configurations, or can be a router, a peer device, or other common network node, and typically includes many or all of the elements described herein relative to computing device 600. Communication between computing devices takes place over a network(s) 620, which provides a logical connection(s) between the computing devices. The logical connection(s) can include one or more different types of networks including, but not limited to, a local area network(s) (LAN) and wide area network(s) (WAN). Such networking environments are commonplace in conventional offices, enterprise-wide computer networks, intranets and the Internet. It will be appreciated that the communications connection(s) 612 and related network(s) 620 described herein are exemplary and other means of establishing communication between the computing devices can be used.

As exemplified in FIG. 6, communications connection(s) 612 and related network(s) 620 are an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, radio frequency (RF), infrared, frequency modulation (FM) radio and other wireless media. The term "computer-readable medium" as used herein includes both the aforementioned storage media and communication media.

As exemplified in FIG. 6, computing device 600 also includes a user interface which includes one or more input devices 614 and one or more output devices 616. Exemplary input devices 614 include, but are not limited to, a keyboard, mouse, pen, touch input device, audio input device (such as a microphone and the like), and camera, among others. A user can enter commands and various types of information into the computing device 600 through the input device(s) 614. Exemplary output devices 616 include, but are not limited to, a display device(s), printer, and audio output devices (such as one or more loudspeakers, headphones, and the like), among others. These input and output devices are well known and need not be described at length here.

Referring again to FIG. 6, the OT technique embodiments described herein can be further described and/or implemented in the general context of computer-executable instructions, such as program modules, which are executed by computing device 600. Generally, program modules include routines, programs, objects, components, and data structures, among other things, that perform particular tasks or implement particular abstract data types. The OT technique embodiments can also be practiced in a distributed computing environment where tasks are performed by one or more remote computing devices 618 that are linked through a communications network 612/620. In a distributed computing environment, program modules can be located in both local and remote computer storage media including, but not limited to, memory 604 and storage devices 608/610.

Wherefore, what is claimed is:

1. A computer-implemented process for optimizing the telepresence of two or more users participating in a telepresence session, said users comprising a mobile user who is utilizing a mobile device (MD) comprising a display screen, and one or more remote users each of whom are utilizing a computer that is connected to the MD via a network, comprising:

using the MD to perform the following process actions:
receiving live video of a first remote user over the network;
displaying default information on the display screen; and
whenever it is detected by the MD that the mobile user has performed a gesture with the MD using a first motion,
displaying the video of the first remote user on the display screen, instead of the default information, wherein gesture detection comprises detecting physical movement of the MD itself,
receiving gaze information for the first remote user over the network, wherein said information specifies what the first remote user is currently looking at on their display device, and
whenever the gaze information for the first remote user specifies that they are currently looking at either a workspace or a video of another remote user, differentiating the video of the first remote user in a manner that indicates to the mobile user that the first remote user is not looking at the mobile user.

2. The process of claim 1, further comprising the actions of:
receiving live video of a second remote user over the network; and
whenever the default information is displayed on the display screen and it is detected by the MD that the mobile user has performed a gesture with the MD using a second motion, displaying the video of the second remote user on the display screen, instead of the default information or the video of the first remote user.

3. The process of claim 2, wherein the default information comprises a workspace, further comprising the actions of:
whenever the video of the first remote user is displayed on the display screen and it is detected by the MD that the mobile user has performed a gesture with the MD using the second motion, displaying the workspace on the display screen, instead of the video of the first remote user or the video of the second remote user; and
whenever the video of the second remote user is displayed on the display screen and it is detected by the MD that the mobile user has performed a gesture with the MD using the first motion, displaying the workspace on the display screen, instead of the video of the second remote user or the video of the first remote user.

4. The process of claim 3, wherein,
the process action of displaying the video of the first remote user on the display screen and the process action of displaying the video of the second remote user on the display screen both comprise an action of providing haptic feedback to the mobile user, said feedback notifying the mobile user that what is displayed on the display screen has changed, and
the process action of displaying the workspace on the display screen also comprises the action of providing haptic feedback to the mobile user, said feedback notifying the mobile user that what is displayed on the display screen has changed.

5. The process of claim 4, wherein,
the MD further comprises a vibration motor, and
the process action of providing haptic feedback to the mobile user comprises activating the vibration motor for a prescribed period of time.

6. The process of claim 4, wherein the haptic feedback is accompanied by either audio feedback, or video feedback, or both audio and video feedback.

7. The process of claim 2, wherein either,
the first motion comprises a leftward motion and the second motion comprises a rightward motion, or
the first motion comprises an upward motion and the second motion comprises a downward motion.

8. The process of claim 7, wherein either,
the leftward motion comprises the MD being tilted about its left edge and the rightward motion comprises the MD being tilted about its right edge, or
the leftward motion comprises the MD being moved horizontally leftward from its vertical axis and the rightward motion comprises the MD being moved horizontally rightward from its vertical axis.

9. The process of claim 7, wherein either,
the upward motion comprises the MD being tilted about its top edge and the downward motion comprises the MD being tilted about its bottom edge, or
the upward motion comprises the MD being moved vertically upward from its horizontal axis and the downward motion comprises the MD being moved vertically downward from its horizontal axis.

10. The process of claim 2, further comprising an action of transmitting information over the network to the computer of each remote user specifying that the video of the first remote user is displayed upon detection by the MD that the mobile user has performed a gesture with the MD using the first motion, and the video of the second remote user is displayed upon detection by the MD that the mobile user has performed a gesture with the MD using the second motion, wherein,
whenever the computer of a given remote user comprises a single display device said computer utilizes said information to determine where on the display device the video of the first remote user and the video of the second remote user are to be displayed, said determination being made in a manner that maintains an intuitive and consistent spatial interrelationship between the mobile user, first remote user and second remote user, and
whenever the computer of a given remote user comprises a separate display device for each remote user participating in the session said computer utilizes said information to determine on which display device the live video of each remote user is to be displayed, said determination being made in a manner that maintains an intuitive and consistent spatial interrelationship between the mobile user, first remote user and second remote user.

11. The process of claim 2, wherein the MD further comprises a front-facing video capture device that captures live video of the mobile user, further comprising the actions of:
(a) transmitting gaze information over the network to the computer of each remote user, said information specifying what the mobile user is currently looking at on the display screen;
(b) whenever what the mobile user is looking at on the display screen changes, transmitting revised gaze information over the network to the computer of each remote user; and
(c) repeating action (b) until the end of the telepresence session.

12. The process of claim 11, wherein,
whenever the mobile user is currently looking at the video of the first remote user on the display screen, the gaze information comprises the name of the first remote user, and
whenever the mobile user is currently looking at the video of the second remote user on the display screen, the gaze information comprises the name of the second remote user.

13. The process of claim 2, further comprising the actions of:
receiving gaze information for the second remote user over the network, wherein said information specifies what the second remote user is currently looking at on their display device;
whenever the gaze information for the second remote user specifies that they are currently looking at either a workspace or the video of another remote user, differentiating the video of the second remote user in a manner that indicates to the mobile user that the second remote user is not looking at the mobile user.

14. The process of claim 2, wherein,
the first motion comprises a leftward motion and the second motion comprises a rightward motion,
the workspace comprises a personal workspace comprising one or more data objects,
the personal workspace is viewable and manipulatable by just the mobile user, and
the display screen is touch-sensitive, further comprising the actions of:
upon sensing that the mobile user touched a particular data object and dragged it leftward along the display screen, transmitting the particular data object over the network to the computer of the first remote user; and
upon sensing that the mobile user touched a particular data object and dragged it rightward along the display screen, transmitting the particular data object over the network to the computer of the second remote user.

15. The process of claim 1, wherein,
the workspace comprises a shared workspace comprising either one or more data objects, or one or more annotations, or a combination of one or more data objects and one or more annotations, and
the shared workspace is collaboratively viewable, manipulatable and annotatable by the mobile user and remote users.

16. A computer-implemented process for optimizing the telepresence of three or more users participating in a telepresence session, said users comprising a mobile user who is utilizing a mobile device (MD) comprising a display screen and an audio output device, and two or more remote users each of whom are utilizing a computer that is connected to the MD via a network, comprising:
using the MD to perform the following process actions:
receiving live video and live audio of a first remote user over the network;
receiving live video and live audio of a second remote user over the network;
displaying a workspace on the display screen, and reproducing the audio of the first and second remote users via the audio output device in a default manner;
whenever the workspace is displayed on the display screen and it is detected by the MD that the mobile user has performed a gesture with the MD using a first motion,
displaying the video of the first remote user on the display screen instead of the workspace, and
reproducing the audio of the first and second remote users via the audio output device in a manner that accentuates the first remote user; and
whenever the workspace is displayed on the display screen and it is detected by the MD that the mobile user has performed a gesture with the MD using a second motion,
displaying the video of the second remote user on the display screen instead of the workspace, and
reproducing the audio of the first and second remote users via the audio output device in a manner that accentuates the second remote user; and wherein
gesture detection comprises detecting physical movement of the MD itself.

17. The process of claim 16, wherein,
the audio output device comprises a single audio channel,
the process action of reproducing the audio of the first and second remote users via the audio output device in a default manner comprises the actions of reproducing the audio of the first remote user through said channel at a first volume, and reproducing the audio of the second remote user through said channel at the first volume,
the process action of reproducing the audio of the first and second remote users via the audio output device in a manner that accentuates the first remote user comprises the actions of reproducing the audio of the first remote user through said channel at the first volume, and reproducing the audio of the second remote user through said channel at a second volume which is less than the first volume, and
the process action of reproducing the audio of the first and second remote users via the audio output device in a manner that accentuates the second remote user comprises the actions of reproducing the audio of the second remote user through said channel at the first volume, and reproducing the audio of the first remote user through said channel at said second volume.

18. The process of claim 16, wherein,
the audio output device comprises a left audio channel and a right audio channel,
the process action of reproducing the audio of the first and second remote users via the audio output device in a default manner comprises the actions of reproducing the audio of the first remote user through just the left audio channel, and reproducing the audio of the second remote user through just the right audio channel,
the process action of reproducing the audio of the first and second remote users via the audio output device in a manner that accentuates the first remote user comprises the actions of reproducing the audio of the first remote user through both the left and right audio channels, and reproducing the audio of the second remote user through just the right audio channel, and
the process action of reproducing the audio of the first and second remote users via the audio output device in a manner that accentuates the second remote user comprises the actions of reproducing the audio of the first remote user through just the left audio channel, and reproducing the audio of the second remote user through both the left and right audio channels.

19. The process of claim 18 wherein,
the process action of reproducing the audio of the second remote user through just the right audio channel whenever the first remote user is accentuated comprises an action of reducing the volume of said audio by a prescribed percentage, and
the process action of reproducing the audio of the first remote user through just the left audio channel whenever the second remote user is accentuated comprises an action of reducing the volume of said audio by the prescribed percentage.

20. A computer-implemented process for optimizing the telepresence of three or more users participating in a telepresence session, said users comprising a mobile user who is utilizing a mobile device (MD) comprising a display screen and a front-facing video capture device that captures live video of the mobile user, and two or more remote users each of whom are utilizing a computer that is connected to the MD via a network, comprising:
using the MD to perform the following process actions:
(a) receiving live video of a first remote user over the network;
(b) receiving live video of a second remote user over the network;
(c) displaying a workspace on the display screen;
(d) transmitting gaze information over the network to the computer of each remote user, said information specifying what the mobile user is currently looking at on the display screen;
(e) whenever what the mobile user is looking at on the display screen changes, transmitting revised gaze information over the network to the computer of each remote user;
(f) receiving gaze information for the first remote user over the network, wherein said information specifies what the first remote user is currently looking at on their display device;
(g) receiving gaze information for the second remote user over the network, wherein said information specifies what the second remote user is currently looking at on their display device;
(h) whenever the workspace is displayed on the display screen and it is detected by the MD that the mobile user has performed a gesture with the MD by tilting the MD about its left edge, displaying the video of the first remote user on the display screen rather than the workspace, wherein whenever the gaze information for the first remote user specifies that they are currently looking at either a workspace or the video of the second remote user, said displayed video is differentiated in a manner that indicates to the mobile user that the first remote user is not looking at the mobile user;

(i) whenever the workspace is displayed on the display screen and it is detected by the MD that the mobile user has performed a gesture with the MD by tilting the MD about its right edge, displaying the video of the second remote user on the display screen rather than the workspace, wherein whenever the gaze information for the second remote user specifies that they are currently looking at either a workspace or the video of the first remote user, said displayed video is differentiated in a manner that indicates to the mobile user that the second remote user is not looking at the mobile user;

(j) whenever the video of the first remote user is displayed on the display screen and it is detected by the MD that the mobile user has performed a gesture with the MD by tilting the MD about its right edge, re-displaying the workspace on the display screen, instead of the first remote user or the second remote user;

(k) whenever the video of the second remote user is displayed on the display screen and it is detected by the MD that the mobile user has performed a gesture with the MD by tilting the MD about its left edge, re-displaying the workspace on the display screen, instead of the video of the second remote user or the video of the first remote user; and (l) repeating actions (e)-(k) until the end of the telepresence session.

* * * * *